United States Patent
Weaver

(10) Patent No.: US 7,149,799 B2
(45) Date of Patent: Dec. 12, 2006

(54) MONITORING TOOL

(75) Inventor: James Mark Weaver, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 677 days.

(21) Appl. No.: 09/888,247

(22) Filed: Jun. 22, 2001

(65) Prior Publication Data

US 2002/0198982 A1    Dec. 26, 2002

(51) Int. Cl.
  *G06F 15/173*    (2006.01)
(52) U.S. Cl. .................. 709/224; 709/219; 709/224
(58) Field of Classification Search ........... 709/201, 709/217–219, 223–225, 206; 713/201
  See application file for complete search history.

(56) References Cited

U.S. PATENT DOCUMENTS 5,758,341 A * 5/1998 Voss ............................ 707/10
6,044,398 A * 3/2000 Marullo et al. ............. 709/219
6,615,259 B1 * 9/2003 Nguyen et al. ............. 709/224
6,801,939 B1 * 10/2004 Chafe .......................... 709/224
6,868,434 B1 * 3/2005 Terranova et al. .......... 709/203

* cited by examiner

*Primary Examiner*—Glenton B. Burgess
*Assistant Examiner*—Yasin M. Barqadle
(74) *Attorney, Agent, or Firm*—Akerman-Senterfitt

(57) ABSTRACT

A method for detecting unreliable response conditions in a plurality of back-end transaction processing systems also can include the steps of: reading a list of references to a plurality of subscribing e-commerce systems; generating and dispatching placebo transactions to each e-commerce system in the list; receiving responses to the dispatched placebo transactions; computing transaction latency data based upon when each placebo transaction is dispatched to a subscribing e-commerce system, and when a corresponding response is received; and, notifying individual subscribing e-commerce systems when computed transaction latency data for the individual subscribing e-commerce systems indicates an unreliable response condition in an associated back-end transaction processing system.

10 Claims, 3 Drawing Sheets

MONITORING TOOL

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates generally to e-commerce systems, and more particularly to monitoring online transaction processing and validation systems.

2. Description of the Related Art

E-commerce systems typically include one or more back-end systems for facilitating the completion of an online transaction. Such back-end systems can include systems for performing credit card clearance, or systems for performing order fulfillment. Examples of order fulfillment systems can include shipping and handling coordination systems, external inventory management systems, tariff determination systems, and the like. Because such back-end transaction processing can be complex, many e-commerce systems rely upon one or more third-party service providers to perform certain back-end transaction processing tasks. In particular, portions of an e-commerce system which are controlled locally can be communicatively linked to those external back-end systems which are controlled by third party providers.

By way of example, many e-commerce systems presently are available which can process retail sales transactions. Typically, these online retail systems can include an interface through which a range of inventory items available for retail sale can be presented to online shoppers. In addition, these online retail systems can include local logic for grouping inventory items selected for purchase by an online shopper, for instance an electronic shopping basket. Finally, these online retail systems can include local logic for performing a "check-out" operation so that when an online shopper chooses to "check-out" of the store, credit card information and shipping information can be collected and accounting can be performed as would be the case when an in-store shopper "checks-out" of a brick-and-mortar retail establishment.

In a typical online retail system, when a shopper selects a check-out operation, product and payment information collected by the online retail system can be forwarded to both a third-party, back-end credit card validation system, and where appropriate, a third-party, back-end shipping system, respectively. Using the forwarded information, these third party systems can perform back-end transaction processing, such as credit card clearing and shipping and handling processing, which would otherwise have to be handled by the online retail establishment. In this way, burdensome back-end processing tasks can be out-sourced to third parties while online retail stores can focus on the marketing and sales aspects of their respective e-commerce systems.

As will be apparent to one skilled in the art, the success of an e-commerce system, particularly an e-commerce system having an online sales aspect, can be dependent on the availability and response time of third-party systems relied upon to provide back-end validation and transaction processing. Specifically, without the availability and rapid response of a third party credit card validation system, e-commerce systems can be unable to process purchase requests. Similarly, without the availability and rapid response of a third party shipping system, e-commerce systems can be unable to coordinate the shipment of requested goods. In the best case scenario, customers are forced to wait for the back-end transaction processing to complete. In the worst case scenario, the transaction cannot be completed due to the complete unavailability of the third-party back-end system. In either case, sales can be lost for circumstances beyond the control of the operator of the e-commerce system.

Importantly, since these third-party validation and transaction processing systems are external to the e-commerce system, it is not possible for the e-commerce system to directly diagnose third-party back-end system failures. Furthermore, it is not possible for the e-commerce system to correct third-party back-end system failures. Rather, the state of health of these third-party back-end systems often cannot be determined by local e-commerce systems. Still, although the operator of an e-commerce system can neither diagnose nor remediate a failure in a third-party back-end system upon which the e-commerce system relies, the mere detection of a fault in a third-party back-end system can be helpful in as much as the e-commerce system can take measures to circumvent the problem. For example, if an e-commerce system detects a failure in one third-party credit card validation system, the e-commerce system can either notify potential customers of anticipated delays, or the e-commerce system can request transaction processing from an alternative third-party source.

SUMMARY OF THE INVENTION

The present invention can include both a monitoring tool for detecting an unreliable response condition in a back-end transaction processing system associated with an e-commerce system, as well as a method for detecting an unreliable response condition in a back-end transaction processing system associated with an e-commerce system. In a first aspect of the invention, the monitoring tool can detect unreliable response conditions not only in the back-end processing system, but also in each network component which communicatively links the back-end processing system to the e-commerce system. Hence, in the first aspect of the invention, the monitoring tool can include a placebo transaction dispatcher for dispatching placebo transactions to a subscribing e-commerce system and not to associated back-end processing systems.

The monitoring tool also can include a response collector for collecting responses to dispatched placebo transactions; a logger for computing transaction latency data based upon when a placebo transaction is dispatched to the subscribing e-commerce system, and when a response is received in the collector; and, an alerter for alerting the subscribing e-commerce system when computed transaction latency data indicates an unreliable response condition in an associated back-end transaction processing system. The monitoring tool can also include a user interface through which a user can monitor the transaction latency data. Notably, the monitoring tool further can include a list of references to a plurality of subscribing e-commerce systems. In that case, the dispatcher can dispatch placebo transactions to each e-commerce system in the list. Conversely, the collector can collect responses to the dispatched placebo transactions.

The logger can compute transaction latency data based upon when each placebo transaction is dispatched to a subscribing e-commerce system, and when a corresponding response is received in the collector. Finally, the alerter can alert individual subscribing e-commerce systems when computed transaction latency data for the individual subscribing e-commerce systems indicates an unreliable response condition in an associated back-end transaction processing system.

Notably, though the monitoring tool can dispatch placebo transactions to the e-commerce system which can forward a transaction to the associated back-end processing system, in a second aspect of the invention, the monitoring tool can dispatch placebo transactions directly to the back-end transaction procession system. In this case, only the reliability of the back-end transaction processing system is determined and not intermediate components which communicatively link the back-end transaction processing system to the e-commerce system. Hence, in the second aspect of the present invention, the monitoring tool can include a placebo transaction dispatcher for dispatching placebo transactions to a back-end transaction processing system associated with a subscribing e-commerce system.

A method for detecting an unreliable response condition in a back-end transaction processing system associated with an e-commerce system can include the steps of: generating a placebo transaction; dispatching the placebo transaction to the e-commerce system; and determining if a response to the placebo transaction is received. If no response to the placebo transaction is received prior to detecting a time-out condition, the e-commerce system can be notified that an unreliable response condition exists in the back-end transaction processing system. Similarly, if a response to the placebo transaction is received after period of time has elapsed from the dispatching of the placebo transaction which exceeds a latency threshold, the e-commerce system can be notified that an unreliable response condition exists in the back-end transaction processing system.

A method for detecting an unreliable response condition in a back-end transaction processing system associated with an e-commerce system alternatively can include the steps of: generating a placebo transaction; dispatching the placebo transaction to the back-end transaction processing system; and, determining if a response to the placebo transaction is received. If no response to the placebo transaction is received prior to detecting a time-out condition, the e-commerce system can be notified that an unreliable response condition exists in the back-end transaction processing system. Additionally, if a response to the placebo transaction is received after period of time has elapsed from the dispatching of the placebo transaction which exceeds a latency threshold, the e-commerce system can be notified that an unreliable response condition exists in the back-end transaction processing system.

A method for detecting unreliable response conditions in a plurality of back-end transaction processing systems also can include the steps of: reading a list of references to a plurality of subscribing e-commerce systems; generating and dispatching placebo transactions to each e-commerce system in the list; receiving responses to the dispatched placebo transactions; computing transaction latency data based upon when each placebo transaction is dispatched to a subscribing e-commerce system, and when a corresponding response is received; and, notifying individual subscribing e-commerce systems when computed transaction latency data for the individual subscribing e-commerce systems indicates an unreliable response condition in an associated back-end transaction processing system.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a monitoring tool that provides a method for empirically validating the on-going availability of one or more back-end systems for verifying and clearing online transactions. Online transactions can include, but are not limited to credit card clearing, shipping and handling, tariff computing, and the like. In operation, the monitoring tool of the present invention can generate placebo transactions which can be submitted to corresponding back-end systems either directly, or via a subscribing e-commerce system. Concurrently, the monitoring tool can collect responses to the placebo transactions from the corresponding back-end systems either directly, or via the subscribing e-commerce system as the case may be. Transaction latency metrics can be computed for each monitored back-end system based on the time when a placebo transaction is submitted and when a corresponding response is received. If the latency metrics for a particular monitored back-end system exceed a specified threshold, the subscribing e-commerce system can be alerted and pro-active measures can be undertaken.

Figure 1:
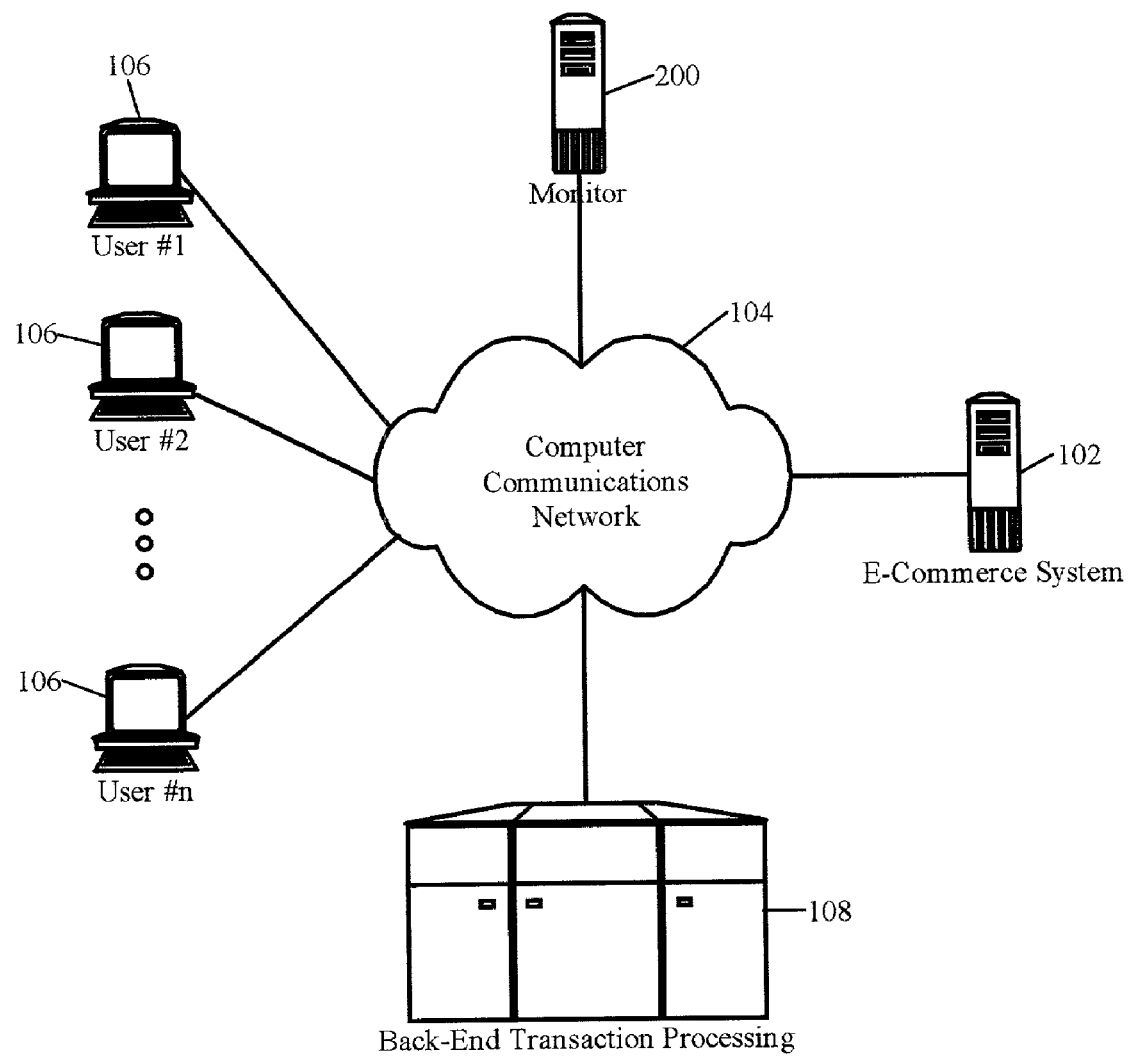
FIG. 1 is a schematic illustration of an e-commerce system communicatively linked to user nodes, a back-end transaction processing system and a monitoring tool which has been configured in accordance with the inventive arrangements.

FIG. 1 is a schematic illustration of an e-commerce system 102 communicatively linked to user nodes 106, a back-end transaction processing system 108 and a monitoring tool 200 which has been configured in accordance with the inventive arrangements. Each of the e-commerce system 102, user nodes 106, back-end transaction processing system 108 and monitoring tool 200 can be communicatively linked via a computer communications network 104, for instance the Internet. The e-commerce system 102 can be any online transactional system, for example online retail systems, online pay-for-service systems, reservation systems, and the like.

Each user node 106 can be any suitable computing having a user interface through which corresponding users can interact with the e-commerce system 102. Notably, while each of the e-commerce system 102, user nodes 106, back-end transaction processing system 108 and monitoring tool 200 can communicate with one another via the public interface to the Internet, the invention is not so limited. Rather, any of the e-commerce system 102, user nodes 106, back-end transaction processing system 108 and monitoring tool 200 can communicate privately through a separate network such as a LAN or WAN, or tthe monitoring tool 200 can communicate privately through a public network such as the Internet using such technologies as virtual private networking (VPN).

Importantly, the e-commerce system can rely upon one or more third-party back-end transaction processing systems 108, for example credit card clearing systems, external inventory management systems, external customer service systems, shipping and handling systems, and other such back-end processing systems. In paticular, in order to complete an online transaction between a user node 106 and the e-commerce system 102, transactional processing must also complete in the back-end transaction processing system. For example, to consummate the online purchase of a book from an online book retailer, the purchaser's credit card must be validated by a third-party credit card validation system.

As one skilled in the art will recognize, if the back-end transaction processing system 108 becomes unavailable, or if the response time of the back-end transaction processing system 108 becomes too great, a user interacting with the e-commerce system 102 via a user node 106 may become impatient and may abandon the transaction without having fully completed the transaction. Accordingly, the monitoring tool 200 of the present invention can monitor the status of the one or more back-end transaction processing systems 108 in order to detect when the back-end transaction processing system 108 becomes unavailable, or if the response time of the back-end transaction processing system 108 becomes too great.

To effectively monitor the back-end transaction processing system 108, the monitoring tool 200 periodically can formulate and submit placebo transactions to selected back-end transaction processing systems 108, optionally via the e-commerce system 102. Each time the monitoring tool 200 submits a placebo transaction to a back-end transaction processing system, the submission time can be recorded. Subsequently, as the monitoring tool 200 receives responses back from the selected back-end transaction processing systems 108, the time of receipt can be recorded and a latency metric can be determined. From the latency metric, the monitoring tool 200 can determine whether the response time of a selected back-end processing system exceeds and acceptable threshold. Of course, where no response is received which corresponds to a placebo transaction submitted to a particular back-end transaction processing system, the monitoring tool 200 can conclude that the particular back-end transaction processing system has become inaccessible.

Once an unacceptable response time or unavailability determination has been made, the monitoring tool can alert subscribing e-commerce systems 102 of the inaccessibility of the monitored back-end data processing system 108. While the subscribing e-commerce systems 102 may not be able to remediate the fault in the back-end data processing system, the subscribing e-commerce system 102 at least can notify the various user via user nodes 106 of the temporary inability of the e-commerce system 102 to accept online transactions. Alternatively, the e-commerce system 102 can fail-over to an alternate back-end processing system, be it a local or outsourced system.

Figure 2:
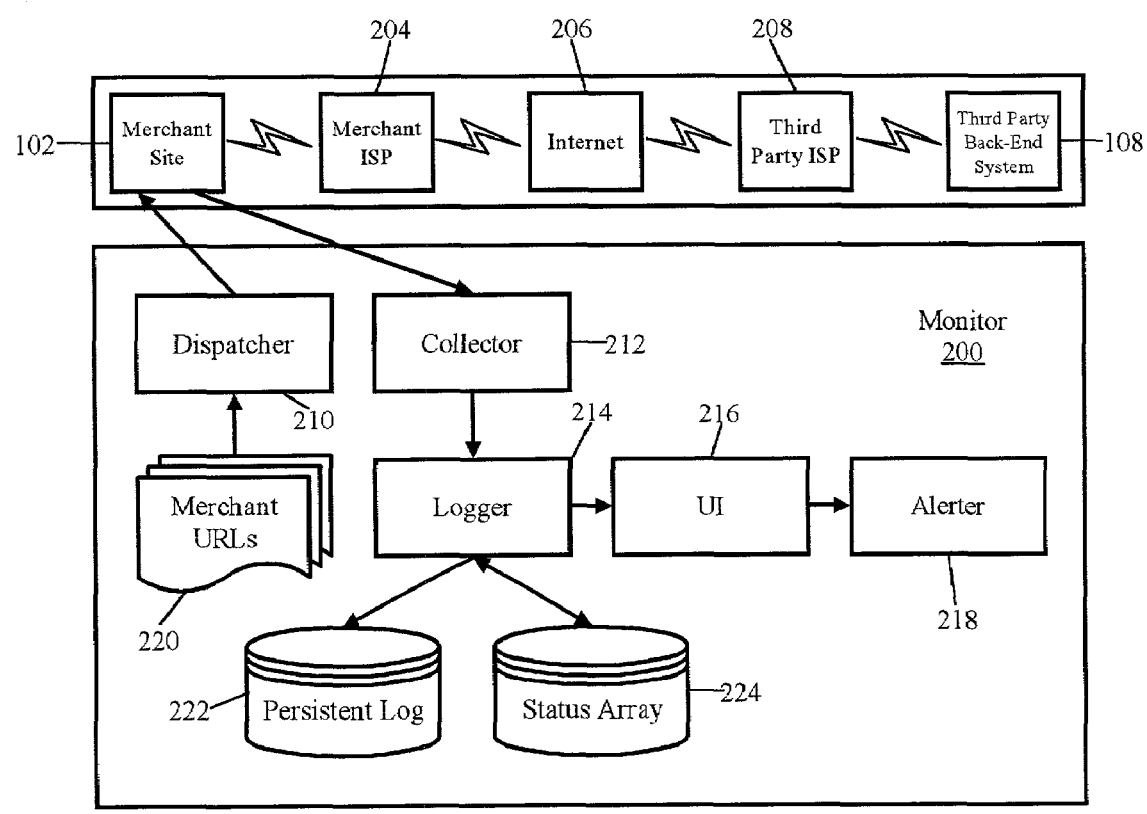
FIG. 2 is a block diagram illustrating one preferred configuration of the monitoring tool of FIG. 1.

FIG. 2 is a block diagram illustrating one configuration of the monitoring tool 200 of FIG. 1. In the present configuration, the monitoring tool 200 can include a dispatcher 210 and a collector 212. The dispatcher 210 can be used to submit placebo transactions to third-party back-end transaction processing systema 108 utilized by subscribing e-commerce systems 102. Conversely, the collector 212 can be used to receive responses to submitted placebo transactions from corresponding third-party back-end transaction processing systems 108. Notably, the dispatcher 210 can identify subscribing e-commerce systems 102 from a subscription list 220, for example a list of URLs for associated e-commerce systems. In this way, placebo transactions can be periodically submitted to each e-commerce system 102 associated with a URL included in the list 220.

As illustrated in FIG. 2, in the present configuration, placebo transactions can be submitted to the third-party back-end system 108 via the e-commerce system 102. Specifically, the dispatcher 210 can spoof the e-commerce system 102 into believing that an actual online transaction has occurred which requires the e-commerce system 102 to request back-end transaction processing from the third-party back-end system 108. In this way, all data metrics which are collected in association with the monitoring of the back-end processing system 108 can appear as it would from the perspective of a user of the e-commerce system 102.

Figure 3:
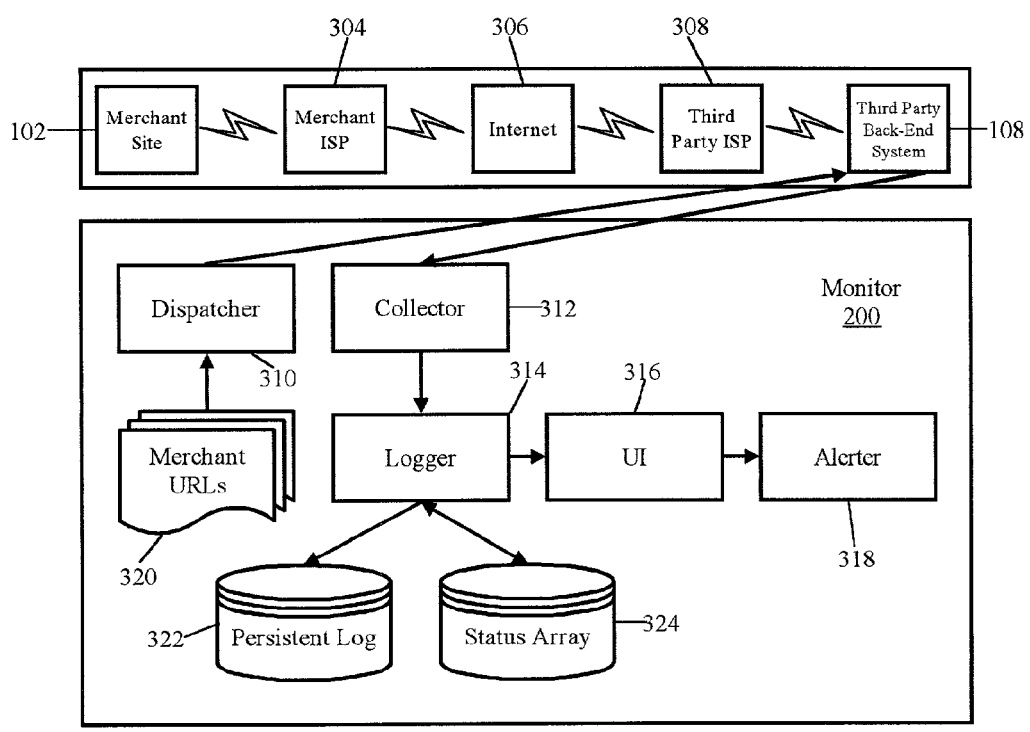
FIG. 3 is a block diagram illustrating a second preferred configuration of the monitoring tool of FIG. 1.

Notwithstanding, the invention is not limited in regard to the network entity which initially receives the placebo submission. In fact, in one aspect of the invention, illustrated in FIG. 3, the dispatcher 310 can bypass the e-commerce system 102 and can submit placebo transactions directly to the back-end system 108 from which the collector 312 can receive responses. In any case, the invention is only limited in as much as ultimately, the third-party back-end server must receive a request for back-end transaction processing based upon a placebo transaction. Thus, if the placebo transaction is first directed towards the e-commerce system 102, then the e-commerce system 102 can forward a request for back-end transaction processing through the ISP 204 of the e-commerce site 102, onto the Internet 206, through the ISP 208 of the third-party back-end system, and finally to the third-party back-end system 108.

Returning now to FIG. 2, each time the dispatcher 210 submits a placebo transaction, associated data can be recorded in both a persistent log 222 and a status array 224 via the logger 214. Concurrently, while the dispatcher 210 transmits placebo transactions to the e-commerce system 102, the collector 212 can receive responses to submitted placebo transactions. As in the case of the dispatcher 210, each time the collector 212 receives a response to a placebo transaction, associated data can be recorded in a persistent log 222 and in a status array 224. More particularly, in response to a submission, the URL of the subscribing e-commerce system 102 can be recorded in addition to the targeted back-end processing system and the time of submission. Similarly, upon receiving a response, the collector 212 can request that the logger 214 record the time the response had been received.

Notably, the status array 224 is a two-dimensional array indexed by the URL and the sample size for each subscribing e-commerce system 102. Each element in the status array 224 can include an indication that a placebo transaction has been submitted and whether a response has been received. Each element in the status array 224 also can include the latency between the submission and response time. Metrics can be recorded in the status array 224 for each subscribing e-commerce system 102. When the number of entries for a subscribing e-commerce system 102 exceeds a pre-specified sample size, older entries can be discarded in favor of newer entries. Based on the data in the status array 224, an average response time can be computed for each subscribing e-commerce system 102. Additionally, non-responsive back-end transaction processing systems can be identified from the status array 224.

The user interface 216 can continuously monitor the data written to the status array 224. In addition to providing a graphical summary of the computed latencies, the user interface 216 can detect latency measurements which fall below a pre-determined threshold. Similarly, when a response has not been received within a pre-specified timeout value, the user interface 216 can conclude that the back-end data processing system 108 is not accessible. In either case, the user interface 216 can notify an alerter 218 which can provide pro-active feedback users. Examples of pro-active feedback can range from a textual or audible alarm provided to a network node or personal device such as a cellular phone or pager, to pre-programmed failover operations.

Importantly, by continuously monitoring third-party back-end transactional processing systems, the monitoring tool of the present invention can detect non-responsive conditions. In consequence, subscribing e-commerce systems can be alerted so that pro-active measures can be undertaken. For example, where the monitoring tool detects longer than acceptable response times in a third-party credit card validation system, subscribing e-commerce systems either can inform online customers that delays can be expected. Alternatively, subscribing e-commerce systems can request credit card clearance from an alternative source of credit card validation.

Notably, the present invention can be realized in hardware, software, or a combination of hardware and software. The method of the present invention performed by the monitoring tool can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which when loaded in a computer system is able to carry out these methods. Computer program means or computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

I claim:

1. A monitoring tool comprising:
   a placebo transaction dispatcher for dispatching placebo transactions to at least one subscribing e-commerce system;
   a response collector for collecting responses to dispatched placebo transactions;
   a logger for computing transaction latency data based upon when a placebo transaction is dispatched to said at least one subscribing e-commerce system, and when a response is received in said collector;
   a multi-dimensional status array indexed by a URL and sample size of each at least one subscribing e-commerce system, said multi-dimensional status array comprising an indicator indicating that a placebo transaction has been submitted to a corresponding subscribing e-commerce system, an indicator indicating whether a response has been received from the corresponding subscribing e-commerce system, transaction latency data associated with the corresponding subscribing e-commerce system, and an average response time for the corresponding subscribing e-commerce system; and,
   an alerter for alerting said subscribing e-commerce system when computed transaction latency data indicates an unreliable response condition in an associated back-end transaction processing system.

2. The monitoring tool of claim 1, further comprising a user interface through which a user can monitor said transaction latency data.

3. The monitoring tool of claim 1, further comprising a list of references to a plurality of subscribing e-commerce systems, said dispatcher dispatching placebo transactions to each e-commerce system in said list, said collector collecting responses to said dispatched placebo transactions, said logger computing transaction latency data based upon when each placebo transaction is dispatched to a subscribing e-commerce system, and when a corresponding response is received in said collector, said alerter alerting individual subscribing e-commerce systems when computed transaction latency data for said individual subscribing e-commerce systems indicates an unreliable response condition in an associated back-end transaction processing system.

4. A monitoring tool comprising:
   a placebo transaction dispatcher for dispatching placebo transactions to at least one back-end transaction processing system associated with a subscribing e-commerce system;
   a response collector for collecting responses to dispatched placebo transactions;
   a logger for computing transaction latency data based upon when a placebo transaction is dispatched to said back-end transaction processing system, and when a response is received in said collector;
   a multi-dimensional status array indexed by a URL and sample size of each at least one subscribing e-commerce system, said multi-dimensional status array comprising an indicator indicating that a placebo transaction has been submitted to a corresponding subscribing e-commerce system, an indicator indicating whether a response has been received from the corresponding subscribing e-commerce system, transaction latency data associated with the corresponding subscribing e-commerce system, and an average response time for the corresponding subscribing e-commerce system; and,
   an alerter for alerting said subscribing e-commerce system when computed transaction latency data indicates an unreliable response condition in said at least one associated back-end transaction processing system.

5. The monitoring tool of claim 4, further comprising a user interface through which a user can monitor said transaction latency data.

6. A computer-implemented method for detecting an unreliable response condition in at least one back-end transaction processing system associated wit an e-commerce system comprising the steps of:
   generating a placebo transaction;

dispatching said placebo transaction to the e-commerce system;

determining if a response to said placebo transaction is received;

if no response to said placebo transaction is received prior to detecting a time-out condition, notifying the e-commerce system that an unreliable response condition exists in the at least one back-end transaction processing system;

if a response to said placebo transaction is received after period of time has elapsed from said dispatching of said placebo transaction which exceeds a latency threshold, notifying e-commerce system that an unreliable response condition exists in the at least one back-end transaction processing system; and recording a plurality of elements in a multi-dimensional status array indexed by a URL and a sample size for each at least one back-end transaction processing system, said multi-dimensional status array comprising an indicator indicating that a placebo transaction has been submitted to a corresponding subscribing e-commerce system, an indicator indicating whether a response has been received from the corresponding subscribing e-commerce system, an indicator indicating whether a latency threshold has been exceeded by the corresponding subscribing e-commerce system, and an average response time for the corresponding subscribing e-commerce system.

7. A computer-implemented method for detecting an unreliable response condition in at least one back-end transaction processing system associated with an e-commerce system comprising the steps of:

generating a placebo transaction;

dispatching said placebo transaction to the back-end transaction processing system;

determining if a response to said placebo transaction is received;

if no response to said placebo transaction is received prior to detecting a time-out condition, notifying the e-commerce system tat an unreliable response condition exists in the back-end transaction processing system;

if a response to said placebo transaction is received after period of time has elapsed from said dispatching of said placebo transaction which exceeds a latency threshold, notifying the e-commerce system that an unreliable response condition exists in the back-end transaction processing system; and recording a plurality of elements in a multi-dimensional status array indexed by a URL and a sample size for each at least one back-end transaction processing system, said multi-dimensional status array comprising an indicator indicating that a placebo transaction has been submitted to a corresponding subscribing e-commerce system, an indicator indicating whether a response has been received from the corresponding subscribing e-commerce system, an indicator indicating whether a latency threshold has been exceeded by the corresponding subscribing e-commerce system, and an average response time for the corresponding subscribing e-commerce system.

8. A computer-implemented method for detecting unreliable response conditions in a plurality of back-end transaction processing systems comprising the steps of:

reading a list of references to a plurality of subscribing e-commerce systems;

generating and dispatching placebo transactions to each e-commerce system in said list;

receiving responses to said dispatched placebo transactions;

computing transaction latency data based upon when each placebo transaction is dispatched to a subscribing e-commerce system, and when a corresponding response is received;

recording a plurality of elements in a multi-dimensional status array indexed by a URL and a sample size for each e-commerce system, said multi-dimensional status array comprising an indicator indicating tat a placebo transaction has been submitted to a corresponding subscribing e-commerce system, an indicator indicating whether a response has been received from the corresponding subscribing e-commerce system, transaction latency data associated with the corresponding subscribing e-commerce system, and an avenge response time for the corresponding subscribing e-commerce system; and notifying individual subscribing e-commerce systems when computed transaction latency data for said individual subscribing e-commerce systems indicates an unreliable response condition in an associated back-end transaction processing system.

9. A machine readable storage having stored thereon a computer program for detecting an unreliable response condition in a back-end transaction processing system associated with an e-commerce system, said computer program having a plurality of code sections executable by a machine for causing the machine to perform the steps of:

generating a placebo transaction:

dispatching said placebo transaction to the back-end transaction processing system;

determining if a response to said placebo transaction is received;

if no response to said placebo transaction is received prior to detecting a time-out condition, notifying the e-commerce system that an unreliable response condition exists in the back-end transaction processing system;

if a response to said placebo transaction is received after period of time has elapsed from said dispatching of said placebo transaction which exceeds a latency threshold, notifying the e-commerce system that an unreliable response condition exists in the back-end transaction processing system; and recording a plurality of elements in a multi-dimensional status array indexed by a URL and a sample size for said transaction processing system, said multi-dimensional status array comprising an indicator indicating that a placebo transaction has been submitted to a corresponding subscribing e-commerce system, an indicator indicating whether a response has been received from the corresponding subscribing e-commerce system, an indicator indicating whether a latency threshold has been exceeded by the corresponding subscribing e-commerce system, and an average response time for the corresponding subscribing e-commerce system.

10. A machine readable storage having stored thereon a computer program for detecting an unreliable response condition in a back-end transaction processing system associated with an e-commerce system, said computer program having a plurality of code sections executable by a machine for causing the machine to perform the steps of:

generating a placebo transaction;

dispatching said placebo transaction to the back-end transaction processing system;

determining if a response to said placebo transaction is received;

if no response to said placebo transaction is received prior to detecting a time-out condition, notifying the e-commerce system that an unreliable response condition exists in the back-end transaction processing system;

if a response to said placebo transaction is received after period of time has elapsed from said dispatching of said placebo transaction which exceeds a latency threshold, notifying the e-commerce system that an unreliable response condition exists in the back-end transaction processing system; and recording a plurality of elements in a multi-dimensional status array indexed by a URL and a sample size for said back-end transaction processing system, said multi-dimensional status array comprising an indicator indicating that a placebo transaction has been submitted to a corresponding subscribing e-commerce system, an indicator indicating whether a response has been received from the corresponding subscribing e-commerce system, an indicator indicating whether a latency threshold has been exceeded by the corresponding subscribing e-commerce system, and an average response time for the corresponding subscribing e-commerce system.

* * * * *